United States Patent
Prakah-Asante et al.

(10) Patent No.: US 9,716,787 B1
(45) Date of Patent: Jul. 25, 2017

(54) METHOD AND APPARATUS FOR CELLULAR DEAD ZONE HANDLING

(71) Applicant: FORD GLOBAL TECHNOLOGIES, LLC, Dearborn, MI (US)

(72) Inventors: Kwaku O. Prakah-Asante, Commerce Township, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/063,991

(22) Filed: Mar. 8, 2016

(51) Int. Cl.
| | | |
|---|---|---|
| *G01C 21/12* | (2006.01) | |
| *H04W 24/00* | (2009.01) | |
| *H04W 4/00* | (2009.01) | |
| *H04M 3/42* | (2006.01) | |
| *H04W 4/16* | (2009.01) | |
| *H04W 4/02* | (2009.01) | |
| *G01C 21/34* | (2006.01) | |

(52) U.S. Cl.
  CPC .... *H04M 3/42195* (2013.01); *G01C 21/3415* (2013.01); *H04W 4/02* (2013.01); *H04W 4/16* (2013.01)

(58) Field of Classification Search
  USPC .............................. 701/411; 455/422.1, 456.1
  See application file for complete search history.

(56) References Cited

U.S. PATENT DOCUMENTS

| | | | | |
|---|---|---|---|---|
| 6,141,565 A | * | 10/2000 | Feuerstein | H04W 16/06 455/422.1 |
| 6,721,572 B1 | * | 4/2004 | Smith | H04W 76/028 370/328 |
| 7,676,224 B1 | * | 3/2010 | Bellovin | H04W 76/028 370/328 |
| 8,494,563 B2 | * | 7/2013 | Jain | H04W 4/02 455/414.1 |
| 8,509,852 B2 | * | 8/2013 | Locker | H04W 4/025 455/450 |
| 9,057,620 B2 | * | 6/2015 | Dave | G01C 21/3461 |
| 2004/0235509 A1 | * | 11/2004 | Burritt | H04M 3/42195 455/519 |
| 2006/0019650 A1 | * | 1/2006 | Kedem | H04W 76/02 455/422.1 |
| 2009/0247137 A1 | * | 10/2009 | Awad | H04M 3/2227 455/418 |
| 2009/0247147 A1 | * | 10/2009 | Hadinata | H04W 4/16 455/421 |
| 2009/0312005 A1 | * | 12/2009 | Mukundan | H04L 1/0002 455/422.1 |
| 2010/0120414 A1 | * | 5/2010 | Bellovin | H04W 76/028 455/423 |

(Continued)

*Primary Examiner* — Tyler Paige
(74) *Attorney, Agent, or Firm* — Jennifer Stec; Brooks Kushman P.C.

(57) ABSTRACT

A system includes a processor configured to receive coordinate information identifying an upcoming cellular dead zone on a vehicle route. The processor is also configured to generate an alert to the upcoming cellular dead zone. The processor is further configured to offer an automatic callback for an ongoing phone call and automatically call back a number associated with the ongoing phone call in response to exiting the cellular dead zone if the call was dropped in the cellular dead zone and the offer was accepted.

18 Claims, 3 Drawing Sheets

(56) References Cited

U.S. PATENT DOCUMENTS

| | | | |
|---|---|---|---|
| 2014/0185581 A1* | 7/2014 | Senarath | H04W 36/0083 370/331 |
| 2014/0199980 A1 | 7/2014 | Rao et al. | |
| 2014/0274009 A1* | 9/2014 | Do | H04W 8/18 455/418 |
| 2015/0094054 A1* | 4/2015 | Osman | H04M 1/72516 455/421 |

* cited by examiner

US 9,716,787 B1

METHOD AND APPARATUS FOR CELLULAR DEAD ZONE HANDLING

TECHNICAL FIELD

The illustrative embodiments generally relate to a method and apparatus for cellular dead zone handling.

BACKGROUND

While cellular coverage has improved significantly over the years, it is not uncommon to encounter areas of travel where, for often unknown reasons, cellular coverage is poor or even absent altogether. Drivers may come to recognize the existence of these areas, and may take steps to avoid them. However, it is not always possible to know where these areas exist in advance. Also, it is sometimes inconvenient to route around these areas, even if the dead zone is known to be present, if a driver is unfamiliar with the surrounding roads.

SUMMARY

In a first illustrative embodiment, a system includes a processor configured to receive coordinate information identifying an upcoming cellular dead zone on a vehicle route. The processor is also configured to generate an alert to the upcoming cellular dead zone. The processor is further configured to offer an automatic call-back for an ongoing phone call and automatically call back a number associated with the ongoing phone call in response to exiting the cellular dead zone if the call was dropped in the cellular dead zone and the offer was accepted.

In a second illustrative embodiment, a system includes a processor configured to detect a cellular signal strength below a predetermined threshold. The processor is also configured to determine that an ongoing phone call has been dropped. The processor is further configured to offer an automatic call-back for the dropped phone call and automatically call-back a number associated with the ongoing phone call, in response to the processor detecting the cellular signal strength above the predetermined threshold and acceptance of the offer.

In a third illustrative embodiment, a system includes a processor configured to receive coordinate values identifying a cellular dead zone upcoming on a vehicle route. The processor is also configured to alert a driver to the upcoming dead zone. The processor is further configured to offer a route-around to travel around the dead zone and, upon acceptance of the route-around, change the vehicle route to avoid the cellular dead zone.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
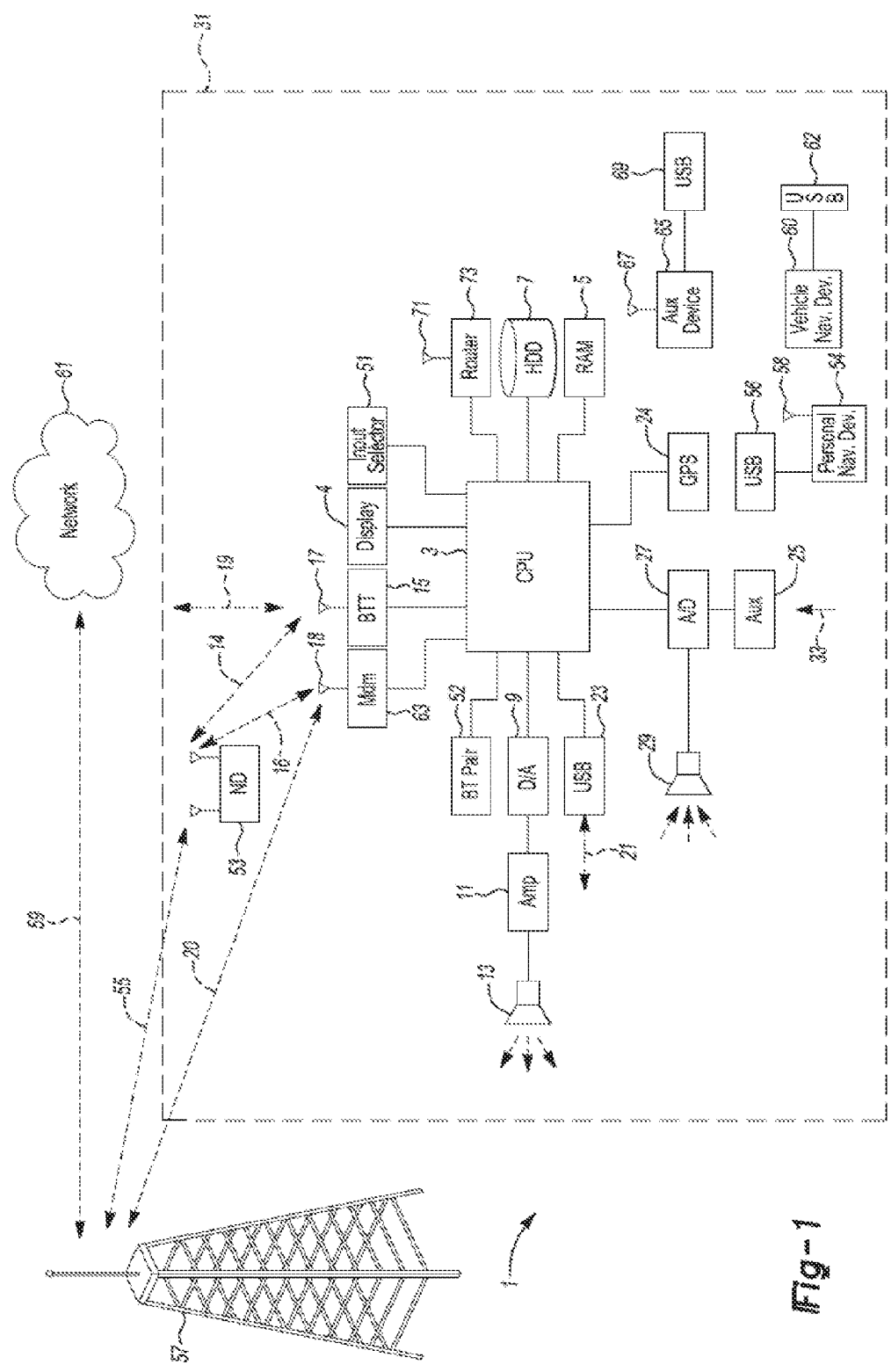
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Automotive original equipment manufacturer (OEM) requirements for the driver cabin experience may include providing relevant telematics and connectivity information to the driver for an enhanced driving experience. Communication signal loss in certain areas, especially urban areas, may occur while engaged in a hands-free call. It can be particularly inconvenient, when a driver traverses areas where telematics signals transverses from high strength to low. A conversation may be interrupted at an inopportune time, without the foreknowledge of the driver or the receiver. This loss can then cause the driver to have to redial, an option which could be repetitively frustrating if driving in the zone persisted, and calls were constantly dropped. While the signal strength indicator may provide information about the cellular signal strength, the driver may have no idea of the current signal strength (or drop therein) in the midst of a call. Signal loss during routine routes may tend to be repetitive.

The illustrative embodiments, among other things, present Telematics Signal State for Driver awareness (TSSD). The TSSD incorporates systems for providing real-time learning of driver encountered telematics areas where communications signals are low for awareness while driving and engaged in communication. The learned low signal strength locations are stored over time, with available latitude/longitude telematics and environment information. The learned locations may be transmitted to a central location database to other vehicles in the network for social usage. Based on forecasted areas the TSSD vehicle can automatically place itself in settings to improve driver interaction and convenience. The driver may select pre-set actions including, but not limited to, providing awareness that signal may be lost while on phone via reminders before entering the zone, for example by a display in the center stack, reminders and offers to automatically call back via voice, and even providing navigation re-route if using a guidance system.

The TSSD incorporates systems for providing real-time learning of driver encountered telematics areas where communications signal strengths are low. When a telematics signal strength is low or lost during a voice call, GPS latitude and longitude information can be logged to categorize the area, and the data can be stored both locally and remotely. Repeated occurrence of the same dead zones or areas of low signal strength can reinforce a stored likelihood value of encountering low signal strength. If crowd-sourcing is used to gather data for a central database, a significant number of drivers encountering low or no signal in an areas can be used to quickly confirm the likelihood of a drop or loss in signal when encountering the area. On the other hand, even if only a local record of the drop or loss is stored, a driver's frequent encounters of low or no signal strength over a commonly traveled route can be used to build a profile of the low signal strength area for that particular driver, especially over the common route.

Figure 2:
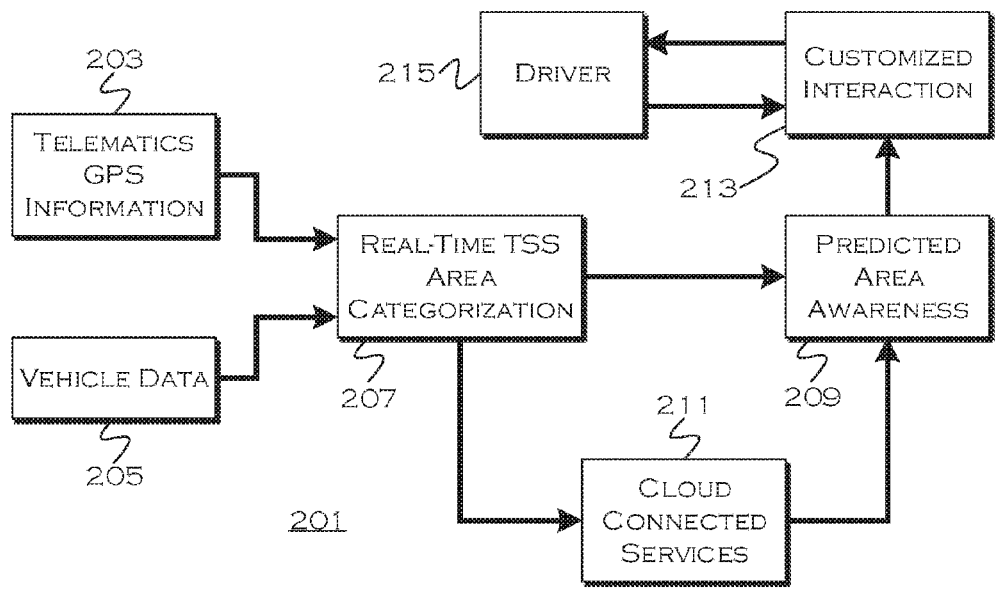
FIG. 2 shows an illustrative system for learning a telematics signal state and providing assistance around a cellular dead zone.

FIG. 2 shows an illustrative system 201 for learning a telematics signal state and providing assistance around a cellular dead zone. This is an illustrative example of system components and functionality, and additional components can be added or removed as appropriate.

In this illustrative example, vehicle data (such as, for example, a telematics signal strength or a signal strength reported from a portable device wirelessly connected to the vehicle, can be fed from the vehicle data module 205 to a real-time telematics signal strength categorization module 207. Vehicle GPS coordinates can be fed from a telematics GPS information module 203, or other source of current vehicle location.

The area categorization module 207 can detect an initial instance of low or no signal strength and associate coordinates with that instance to form an initial likelihood of loss or lowering of signal for those coordinates. Since a single instance may not be indicative of a persistent problem, the process may set an initial likelihood of low or lost signal to be fairly low. As more vehicles encounter the same problem at or near the same coordinates, this likelihood can be raised to represent a more accurate likelihood of lost signal or lowered signal. If few or no other vehicles encounter the loss in signal, the likelihood may be decreased, as the lowering or loss may have been a one-off situation.

On the other hand, it is possible that even an initial encounter may result in a higher or 50/50 probability being set initially, with reliance on encounters by other vehicles, or lack thereof, to quickly tune the probability as noted above. The initial probability can be set to any reasonable number, depending on whether the system implementer prefers to err on the side of over or under warning. Since, in at least one example, crowdsourcing is used to gather data on the low signal zone, any area wherein a reasonable number of vehicles travel should be tunable fairly quickly to a reasonably accurate likelihood.

It is also possible, for example, to associate a particular signal strength with a particular mobile carrier, as some mobile carriers may receive no signal in an area, whereas other mobile carriers will receive an acceptable signal. In this instance, it may be undesirable to tune the likelihood variable with respect to all mobile carriers, treating it as a single variable, since the data received from different mobile carriers will tend to improperly influence the likelihood for another mobile carrier. On the other hand, if the implementation is concerned with, for example, a vehicle installed telematics modem's signal, and a single carrier is used for all vehicles, then there will be no carrier-variance, and all vehicles can contribute to a result with a reasonable expectation of consistency in observation.

The real-time area awareness module can feed data relating to dead zones to a connected services module 211. By amassing data from a number of vehicles, the cloud connected services module can build a database of low or no signal areas, and feed this information to a predictive area awareness module 209. This module can be used to identify upcoming dead zones for a traveling vehicle (before they are actually encountered). The module can determine a likely time to encountering a dead zone, and can send this information, as well as information known about the upcoming dead zone (such as, for example, dead zone size or portion of upcoming route covered by the dead zone) to a customized interaction module 213.

The customized interaction module can use information received from the vehicle data module 205 to determine, for example, whether or not a phone call is currently in progress. If a call is in progress, this module can offer the driver 215 an option to call back when a dead zone is exited. For example, the call may persist until it is actually dropped (by encountering the dead zone) and the system can wait until the vehicle clears the dead zone before calling back the dropped number. Even if a dead zone is encountered for the first time, the system can detect that a call was dropped and offer an option to call back when the system detects a signal strength above a predefined threshold.

Figure 3:
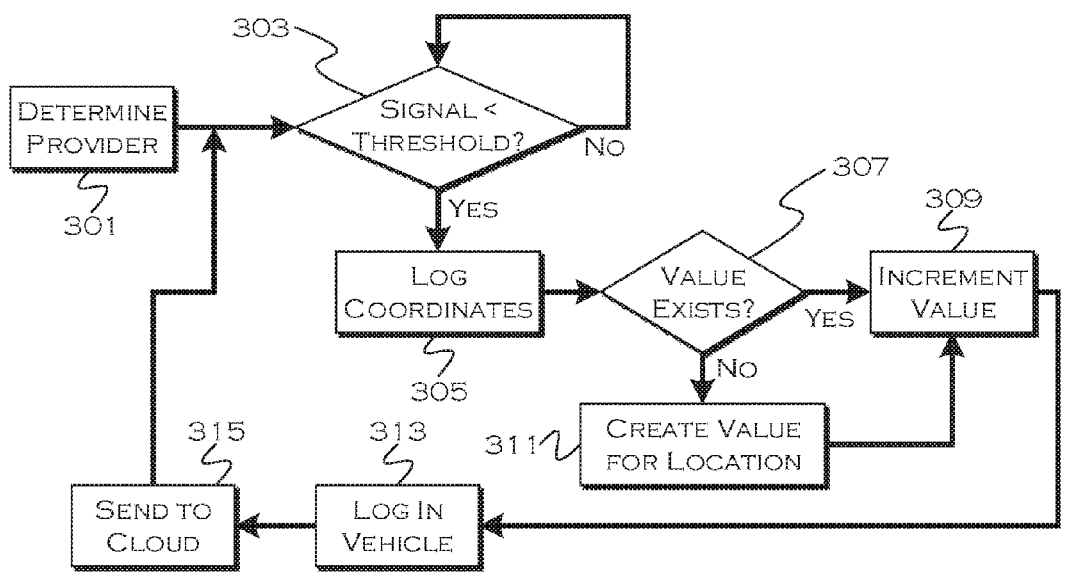
FIG. 3 shows an illustrative process for tracking cellular dead zones.

FIG. 3 shows an illustrative process for tracking cellular dead zones. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the signal strength is correlated to a determined provider 301, in case the signal varies by provider, but in other examples a general signal strength may be determined based on all data reported. Alternatively, all vehicle telematics modules may use the same provider and render the provider determination moot for a particular implementation.

Once the provider has been determined, the process continues to monitor the signal associated with a vehicle telematics unit or a wireless device connected to the vehicle. If the signal drops below a predetermined threshold 303, the process can then proceed to log coordinates where the drop occurred 305.

If there is already a likelihood value of signal loss or drop associated with these coordinates 307, the process can increment the value 309, representing an increasing likelihood of signal loss. If there is no likelihood value associated with the coordinates (i.e., the signal drop or loss is encountered for a first time), the process can create a new value for a given location 311, which may be set to an initial likelihood value determined by a system design. Of course, other methodologies, such as using a ratio of vehicles encountering a signal loss to not-encountering a signal loss for a given location are also within the contemplated scope of the illustrative embodiments. Likelihood values can be stored in a carrier-agnostic or carrier-specific manner.

The system may also be able to decrement values for low signal or dead zones as those zones are reached by vehicles and no loss or lowering of signal is encountered. For example, a provider may have expanded coverage such that a dead zone no longer exists.

Several illustrative examples are presented for decrementing dead zone coordinates. First, a system can "know" all dead zone coordinates along a given route when a route is determined. As each set of coordinates is encountered, the system can decrement a likelihood value or report the non-loss to a remote server to decrement the value anywhere a signal is not lost or lowered below a threshold. In another example, a system can alert a driver of an upcoming dead zone, having been provided the dead zone information from a remote server, or having obtained the information from a locally stored list of coordinates. If the vehicle then enters the dead zone, actual signal strength throughout travel across the projected dead zone coordinates can be used to increment or decrement dead zone likelihood values. In general, decrementing occurs when a vehicle expects to encounter a signal drop or loss, and then does not actually encounter the drop or loss at the expected coordinates.

In this illustrative example, a local value for signal strength is stored 313, and a value is also sent to the cloud for use in crowd sourced data 315. It may be useful to locally store some or all coordinates as the cloud may not be accessible to retrieve all coordinate information, especially for a large dead zone area. By storing observed values locally, the driver can at least have some onboard capability of zone prediction without having to rely on a possibly unavailable cloud connection.

Figure 4:
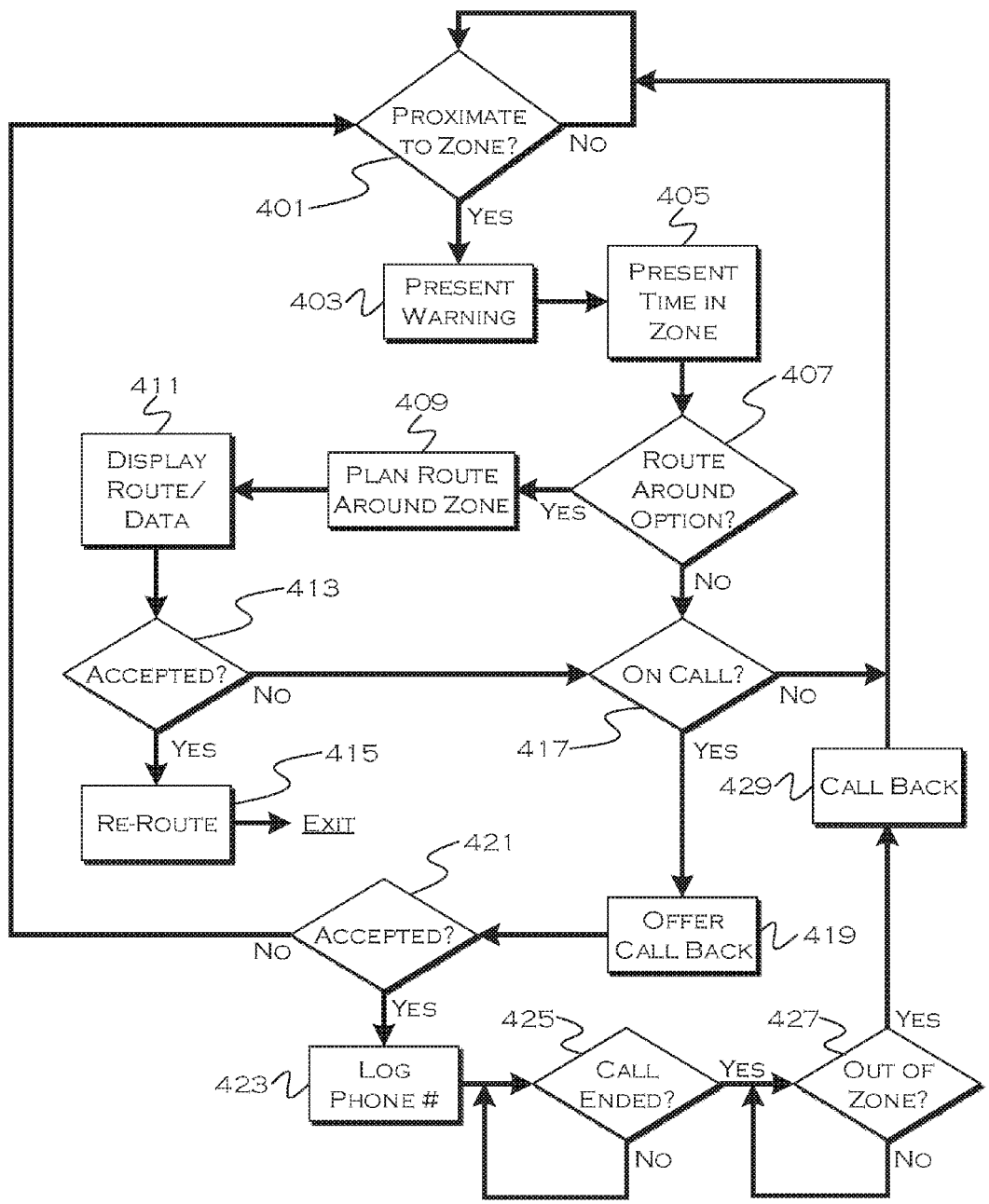
FIG. 4 shows an illustrative process for dead zone handling.

FIG. 4 shows an illustrative process for dead zone handling. With respect to the illustrative embodiment described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process determines if a particular user is approaching a known dead zone 401. As used herein, dead zone can mean a zone where signals are completely unavailable, where signals are frequently intermittent, or where signals are so low as to often be unreliably usable. This data can be downloaded for an entire route in advance or downloaded dynamically as a vehicle travels (for example, data for an upcoming X amount of road or in a zone around a vehicle). In another example, data for commonly encountered dead zones or any encountered dead zones, may also be stored onboard the vehicle, so that the actual encounter of a dead zone does not prevent useful data from being downloaded.

If a vehicle is approaching the dead zone, the process presents a warning to the driver 403. This can alert the driver to the upcoming zone and may also present the driver with a number of options to mitigate the effect of the zone on the driver experience. Also, in this example, the system presents a "time in zone" 405, which will let the driver know how far or long the travel in the zone is projected to persist. For example, a driver traveling at 60 miles per hour on a relatively straight route through a zone of 0.5 by 0.5 miles would spend 30 seconds in the zone. This might not be enough time to justify a route-around, unless the driver was on a very important call (or, for example, had been on hold with a customer service entity for forty minutes). The alert can also include a distance-to-zone or time-to-zone.

In another example, a route or surrounding area may be displayed on a center stack as part of a navigation display with the dead zone (or all dead zones) displayed based on coordinates received identifying the dead zone. Coordinates could be received that define a fence around the zone (if, for example, most or all coordinates within the zone had been confirmed as "dead" with a threshold degree of confidence), or coordinates for each point identified as "dead" could be received and populated onto the display.

In this example, the driver is presented with an option to route-around a zone (if such an option is available, and at least one known route around the zone exists) 407. If the driver elects to route-around the zone 407, the system can plan a route that avoids the known boundaries of the zone 409, and display this route for driver acceptance 411. It is also possible for a driver to configure preset settings, such as "always route around zones while a call is in progress" or "always accept route-arounds of less than X distance or Y minutes," etc.

Here, if the driver accepts the presented alternative route 413, the process will change a current route 415 to avoid the zone and exit. Assuming the driver follows the route, no connection problems should be encountered. If the driver does not follow the route, the process shown in FIG. 4, or a similar process, can repeat to address the zone.

If the driver does not desire to route around the zone, the process will determine if the driver is on a call, currently 417. As previously noted, the driver may have an option such as "always route around when a call is in progress," so it is quite possible the call determination occurs earlier in the decision-making process. It is understood that the ordering of the steps of the illustrative methods can be changed in manners that facilitate different embodiments.

If the driver is on a call, the process can offer an automatic call back service 419. This will allow the vehicle to automatically call back to a dropped call, without the driver having to determine when the call should be made, or repeatedly failing to complete a call back because a dead zone has not yet been exited.

If the driver accepts the callback 421, the process can log a current phone number (or can forego logging, and can simply retrieve the number if a callback is needed, from a caller ID log). If, at any point, the call is prematurely ended 425, the process can then wait until the vehicle is out of the dead zone 427 and then call back the number 429. Similarly, for example, the system could detect an attempted call while the vehicle was in a dead zone, and offer to call the number back automatically when the zone was exited (if the attempted call failed).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive coordinate information identifying an upcoming cellular dead zone on a vehicle route;
generate an alert to the upcoming cellular dead zone; and
display a portion of the vehicle route, including displaying the cellular dead zone, on a vehicle display; and
automatically call back a number associated with a phone call in response to exiting the cellular dead zone if the call was dropped in the cellular dead zone and an offer to call-back was accepted.

2. The system of claim 1, wherein the coordinate information includes a likelihood value of a dead zone for each of a set of coordinates within the dead zone.

3. The system of claim 2, wherein the processor is configured to record, for each set of coordinates of the coordinate information encountered by the vehicle, an increased or decreased likelihood value of the dead zone, based on whether a signal strength below a threshold was or was not encountered, respectively.

4. The system of claim 3, wherein the processor is configured to store the increased and decreased likelihood values locally on a vehicle memory.

5. The system of claim 3, wherein the processor is configured to report the increased and decreased likelihood values to a remote server.

6. The system of claim 2, wherein the processor is configured to:
display the cellular dead zone based on a received perimeter of coordinates when more than a threshold percentage of coordinates within the cellular dead zone indicate a likelihood of representing dead coordinates above a threshold likelihood.

7. The system of claim 2, wherein the processor is configured to:
display the cellular dead zone based on a display of individually received dead zone coordinates when less than a threshold percentage of coordinates within the cellular dead zone indicate a likelihood of representing dead zone coordinates above a threshold likelihood.

8. The system of claim 2, wherein the likelihood value varies between different coordinate sets and represents an observed likelihood of dropping a call at a given coordinate set.

9. The system of claim 1, wherein the processor is configured to:
detect a failed phone call attempt while the vehicle is traveling in the dead zone;
offer the automatic call back for the failed phone call attempt; and
automatically call back a number associated with the failed phone call attempt in response to exiting the dead zone by the vehicle.

10. The system of claim 1, wherein the alert includes a projected duration of travel within the dead zone.

11. The system of claim 1, wherein the alert includes a projected distance of travel within the dead zone.

12. The system of claim 1, wherein the alert includes a projected time until the dead zone is reached.

13. The system of claim 1, wherein the alert includes a projected distance until the dead zone is reached.

14. A system comprising:
a processor configured to:
detect a cellular signal strength below a predetermined threshold;
detect a failed phone call attempt when the cellular signal strength is below the predetermined threshold;
offer an automatic call-back for the failed phone call attempt; and
automatically call-back a number associated with the failed phone call, in response to the processor detecting the cellular signal strength above the predetermined threshold and acceptance of the offer.

15. The system of claim 14, wherein the cellular signal strength is reported to the processor from a wirelessly connected device.

16. The system of claim 14, wherein the cellular signal strength is detected by a telematics modem installed in a same vehicle as the processor.

17. The system of claim 14, wherein the processor is configured to record coordinate values for each identifiable point on a trip where the cellular signal strength is below the predetermined threshold.

18. The system of claim 17, wherein the processor is configured to report the coordinate values to a remote server.

* * * * *